United States Patent

Ohtsuka et al.

[11] Patent Number: 5,099,474
[45] Date of Patent: Mar. 24, 1992

[54] DIGITAL EXCHANGE AND ITS CONTROL METHOD

[75] Inventors: Eiji Ohtsuka; Kimio Ikemori, both of Hino, Japan

[73] Assignee: Kabushiki Kaisha Toshiba, Kawasaki, Japan

[21] Appl. No.: 454,597

[22] Filed: Dec. 21, 1989

[30] Foreign Application Priority Data

Dec. 22, 1988 [JP] Japan .................... 63-324866
Jan. 12, 1989 [JP] Japan .................... 1-5430

[51] Int. Cl.$^5$ ............................ H04Q 11/04
[52] U.S. Cl. ................................. 370/58.1
[58] Field of Search ............... 370/58.1, 66, 58.3, 370/84, 112, 100.1

[56] References Cited

U.S. PATENT DOCUMENTS

| | | | |
|---|---|---|---|
| 3,863,033 | 1/1975 | Chen et al. | 370/58.1 |
| 4,332,026 | 5/1982 | Alvarez, III et al. | 370/66 |
| 4,339,815 | 7/1982 | Herledan et al. | 370/58.1 |
| 4,499,575 | 2/1985 | Dupuis et al. | 370/58.3 |
| 4,546,469 | 10/1985 | Favrel et al. | 370/77 |
| 4,633,460 | 12/1986 | Suzuki et al. | 370/58 |
| 4,698,801 | 10/1987 | Hatano et al. | 370/84 |

FOREIGN PATENT DOCUMENTS 0220943 9/1989 Japan .................... 370/58.1

Primary Examiner—Douglas W. Olms
Assistant Examiner—Dang Ton
Attorney, Agent, or Firm—Finnegan, Henderson, Farabow, Garrett, and Dunner

[57] ABSTRACT

A digital exchange which can prevent its failure even when an abnormality takes place in one of digital trunks extracting clock signals from digital lines, so long as at least one of the digital trunks is normal, and also a method of controlling the digital exchange. A common transmission line is used for the clock signals extracted at the digital trunks, a synchronizing-signal generating circuit is provided for generating a synchronizing signal having a predetermined period with use of the clock signal received from one of the digital trunks through the common transmission line, and the clock extracting circuit in each of the digital trunks is provided with a circuit for sending the extracted clock signal from the digital line onto the transmission line in synchronism with the synchronizing signal. Further, a shift in frequency synchronization between the synchronizing clock provided to the time divisional switch and a frame synchronizing signal issued from the time divisional switch is detected and when the shift reaches to a predetermined level, its own synchronizing clock is sent to the time divisional switch.

13 Claims, 12 Drawing Sheets

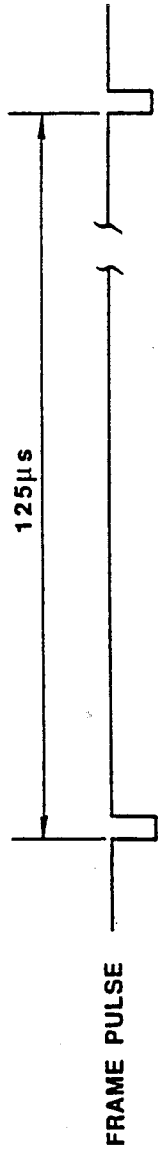
FIG. 5(a) FRAME PULSE — 125μs
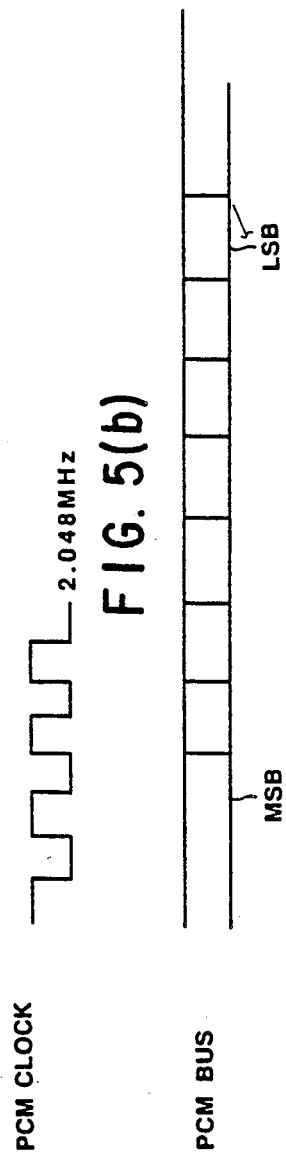
FIG. 5(b) PCM CLOCK — 2.048MHz
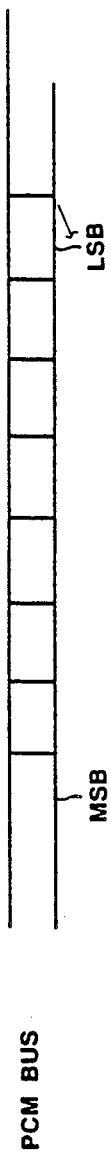
FIG. 5(c) PCM BUS — MSB to LSB
FIG. 5(d) — Ch 1, Ch 2 ... Ch 31, Ch 32
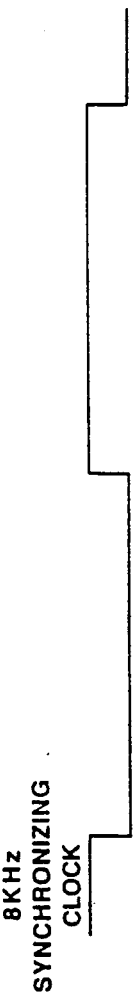
FIG. 5(e) 8KHz SYNCHRONIZING CLOCK

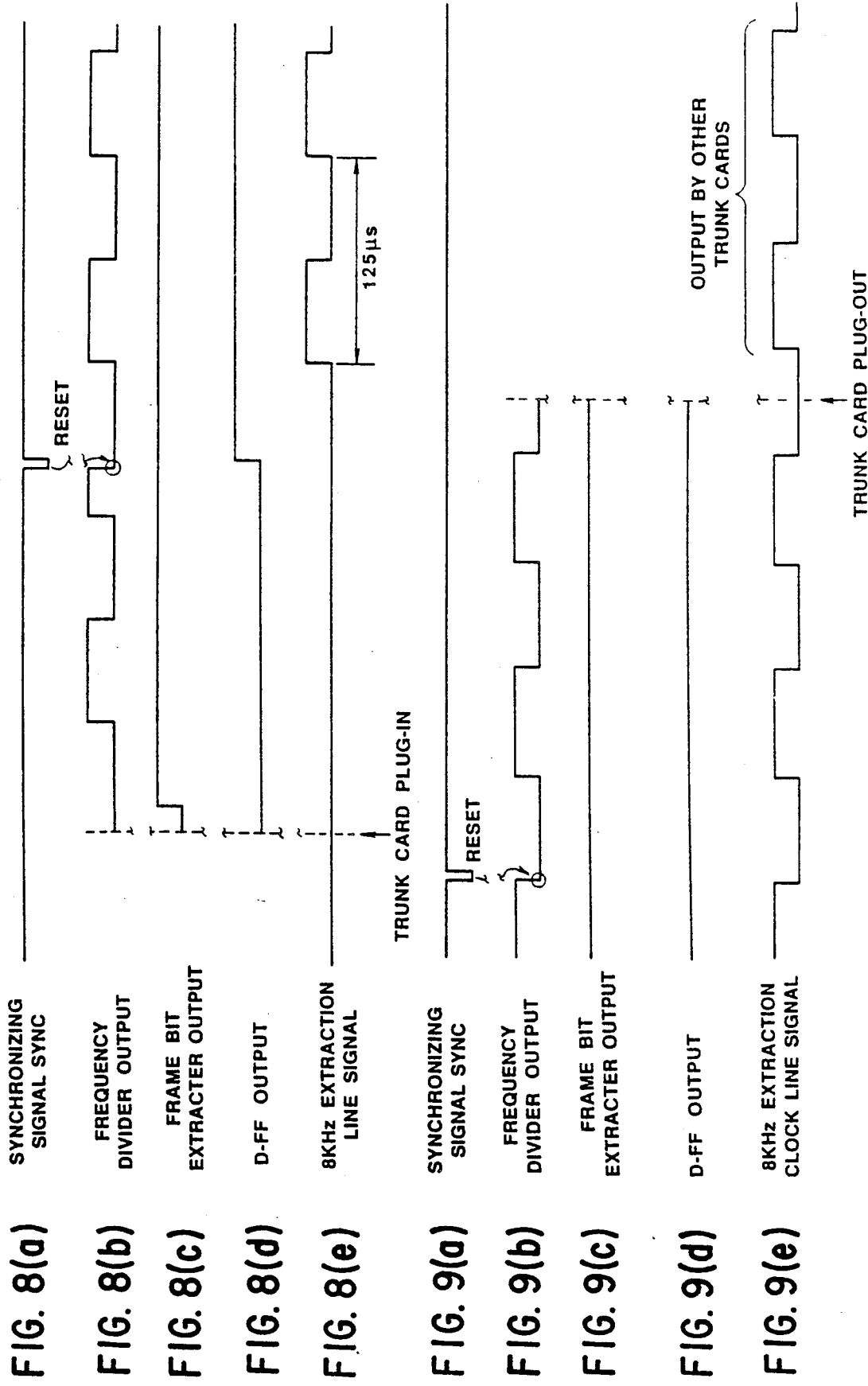

FRAME PULSE
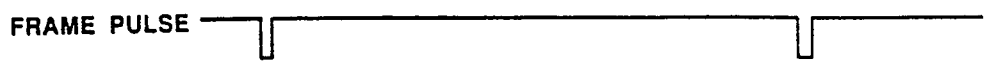
FIG. 13(a)
DS1 EXTRACTION CLOCK
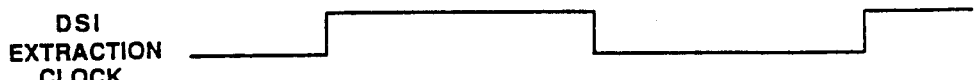
FIG. 13(b)
FLIP-FLOP 801 OUTPUT Q
FIG. 13(c)
XOR GATE 802 OUTPUT
FIG. 13(d)
ONE-SHOT CIRCUIT 806 OUTPUT A
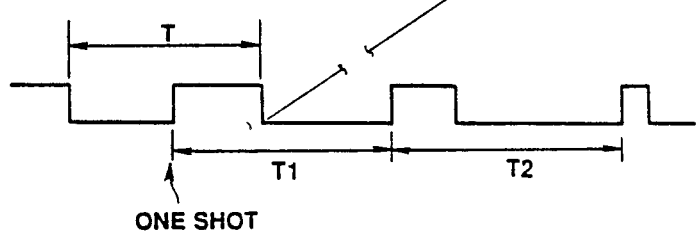
FIG. 13(e)
ONE-SHOT CIRCUIT 806 OUTPUT Q
FIG. 13(f)
ONE-SHOT CIRCUIT 811 OUTPUT A
FIG. 13(g)
ONE-SHOT CIRCUIT 811 OUTPUT Q
FIG. 13(h)
ONE-SHOT CIRCUIT 806 OUTPUT
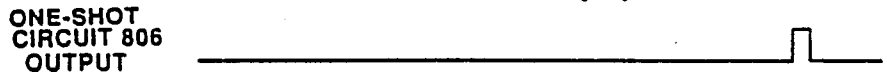
FIG. 13(i)
DS1 EXTRACTER 815 OUTPUT $\overline{Q}$
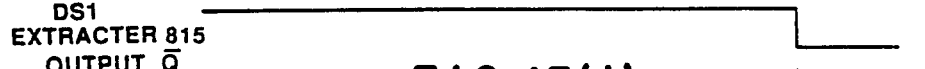
FIG. 13(j)
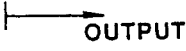

DIGITAL EXCHANGE AND ITS CONTROL METHOD

BACKGROUND OF THE INVENTION

1. Field of the Invention

The present invention relates to an improvement in a digital exchange having a plurality of digital trunks connected to digital lines and to an improvement in a control method thereof and, more particularly, to a digital exchange which can suppress the failure of the exchange even when an abnormality or abnormalities occur in any of digital trunks from which clocks are extracted through the associated digital lines so long as at least one of the digital trunks is normal and also to a control method thereof.

2. Description of the Prior Art

An exchange generally functions to exchange interconnection between a plurality of extension telephone sets, connection of the extention telephone sets to central office lines (outside lines), connection of the central office lines to the extension telephone sets, and so on. There has been recently suggested a digital exchange which comprises digital trunks (which will be referred to as the T1 trunk, hereinafter) and functions to exchange digital data. FIG. 1 shows an arrangement of this type of digital exchange (which will be referred to merely as the exchange, hereinafter). In the drawing, an exchange 105 has T1 trunks 106, 107, 108, ... which are connected at their one ends to a time switch 109 and also connected at the other ends to a central office 101 through a channel unit 102 acting as an interface with the central office 101 and through a T1 network 115. The time switch 109 is also connected with an extension telephone set 111 through an extension interface 110. In the illustrated example, 1.544 Mbps digital lines 112, 113, 114, ... are connected between the T1 trunks 106, 107, 108, ... and the channel unit 102, these trunks employing an interface called a DA format therebetween. In practical applications, a plurality of such channel units 102 are provided to be connected to the common central office 101 through the T1 network 115 being synchronized with respect to frequency.

The DS1 format employed in the digital line 112, 113, 114, ... are shown in FIGS. 2(a) and (b), which is constituted of 12 frames as a multi-frame configuration each corresponding to 125 μs and having 24 channels multiplexed. Each frame has a synchronization bit provided in its heading part and each channel consists of 8 bits least significant one LSB of which is allocated as a signaling bit. It is the T1 trunks 106, 107, 108, ... that establish interface with the digital lines 112, 113, 114, ..

Referring to FIG. 3, there is shown a detailed arrangement of the exchanged of FIG. 1 having the plurality of T1 trunks, in which a data bus 207 for transmitting control data to the T1 trunks 106, 107, 108, ... therethrough as well as a PCM bus 206 for transmitting voice data subjected to a PCM (pulse code modulation) to the T1 trunks therethrough are provided to be connected to the T1 trunks 106, 107, 108, ... The PCM bus 206 is also connected to the time switch 109. The time switch 109 performs the exchange of the PCM voice data between the trunks 106, 107, 108, ... and connection therebetween. More specifically, the T1 trunk 106 extracts a DS1 clock signal 205 from the digital line 112 and sends it to the time switch 109 which in turn is operated in synchronism with the received DS1 clock signal. In the illustrated example, the DS1 clock signal 205 as an output of the T1 trunk 106 must be synchronized with a synchronization clock of the PCM bus 206 with respect to frequency. To this end, it is necessary for the time switch 109 to be synchronized with the DS1 clock signal 205. In this way, the DS1 clock signal 205 extracted at the T1 trunk 106 is used for the above frequency synchronization.

The details of the T1 trunk 106 are shown in FIG. 4, in which a clock extracting circuit 310 extracts the DS1 clock signal 205 on the basis of a signal received through a receiver 308 from the digital line 112 and sends the extracted clock signal 205 to the time switch 109. The data signal of the digital line 112 received through the receiver 308 is also applied to a rate conversion part 307 to be converted thereat to a 2 Mbps signal which is then supplied to a signaling-signal extracting part 306 and an alarm detector 311.

Meanwhile, with respect to the data signal on the PCM bus 206, channels (ch1, ch2, ..., and ch32) are multiplexed as synchronized with a 2.048 MHz PCM clock signal at a rate of 2.048 Mbps in the pulse-to-pulse period of one frame corresponding to 125 μs. The manner is shown in FIGS. 5(a) to (e). More in detail, FIG. 5(a) shows the 125 μs frame pulse, FIG. 5(b) shows the 2.048 MHz PCM clock signal, FIG. 5(c) shows the PCM bus data, FIG. 5(d) shows the channels of the PCM bus, and FIG. 5(e) shows an 8 KHz synchronzation clock signal. Accordingly, it is necessary to absorb or arrange a difference in transmission rate between the digital line 112 and the PCM bus 206. For the purpose of arranging the rate difference, FIFOs 301 and 305 are connected to the PCM bus 206.

A 2 Mbps signal converted at the rate converter 307 is subjected at the signaling signal extracter 306 to an extraction to obtain a signaling signal that is then sent to the PCM bus 206 through the FIFO 305.

A PCM voice signal to be transmitted from the PCM bus 206 to the central office, on the other hand, is supplied through the FIFO 301 to a signaling-signal inserting part 302 to be subjected to a signaling insersion thereat and then applied to a rate coverter 303. The signal applied to the rate converter 303 is rate-converted thereat from the 2 Mbps signal to a 1.5 Mbps signal and then sent through a driver 304 onto a digital line 112.

In the event where the plurality of T1 trunks 106, 107, 108, ... are connected to the channel unit 102 as shown in FIG. 1, data on the plurality of digital lines 112, 113, 114, ... are mutually synchronized. Thus, the DS1 clock signal to be supplied to the time switch 109 in FIG. 3 is extracted at any one of the plurality of T1 trunks 106, 107, 108, ..., and at the T1 trunk 106 in the example of FIG. 3 so that the extraction and output of the DS1 clock signal are not carried out at the other T1 trunks 107, 108, ... And the time switch 109, which is shown in FIG. 6 in detail, receives the DS1 clock signal at a PLL circuit 401 which in turn sends it to a selector 404. The selector 404 also receives a clock signal from an emergency clock oscillator 403. The selector 404 usually selects the DS1 clock signal as a clock signal and sends it to a frequency divider 406. When the DS1 clock signal becomes abnormal, the selector 404 selects a clock signal from the oscillator 403 and sends it to the frequency divider 406. The clock signal received at the frequency divider 406 is frequency-divided to obtain a frame pulse 407 and a PCM clock 408 which are then applied to a speech memory 409 to establish synchronization between the transmission and reception of the PCM data.

In the event where some abnormality takes place in the digital line 112 and the T1 trunk 106 cannot extract the DS1 clock signal properly, the DS1 clock signal supplied to the time switch 109 becomes abnormal. At this time, the time switch 109 is operated with the clock signal from the emergency clock oscillator 403. However, this operation is for the purpose of saving various sorts of data necessary at the time of its restoration and thereafter the exchanging operation is stopped. For this reason, the above prior art digital exchange has had such a problem that, when some trouble occurs in the digital line 112 for the DS1 clock signal to be extracted or when the T1 trunk 106 acting to extract the DS1 clock signal becomes faulty, the whole operation of the exchange is stopped even if the other digital lines 113, 114, . . . and the other T1 trunks 107, 108, . . . are all normal.

The above T1 trunks are, in some cases, made respectively in the form of a digital trunk card to be arbitrarily plugged in and out. In this case, when one of the digital trunk cards playing a role of extracting the DS1 clock signal is erroneously plugged out for maintenance, it becomes impossible to extract the DS1 clock signal, thus involving the similar problem to in the above.

SUMMARY OF THE INVENTION

It is an object of the present invention to provide a digital exchange which can prevent the failure of the exchange so long as at least one of T1 trunks is normal and thus can secure its high reliability, and also to provide a method for controlling the digital exchange.

Another object of the present invention is to provide a digital exchange which can positively establish synchronization between the exchange and associated lines even when any of a plurality of digital trunk cards accommodated within the exchange is plugged out.

In accordance with an aspect of the present invention, a common transmission line is used for the clock signals extracted at the digital trunks, a synchronizing-signal generating circuit is provided for generating a synchronizing signal having a predetermined period with use of the clock signal received from one of the digital trunks through the common transmission line, and the clock extracting circuit in each of the digital trunks is provided with a circuit for sending the extracted clock signal from the digital line onto the transmission line in synchronism with the synchronizing signal.

That is, all the trunk circuits extract clock signals CK and send them onto the common transmission line. The synchronizing-signal generating circuit generates the synchronizing signal in synchronism with the clock signal CK sent from one of the digital trunks onto the common transmission line and supplies the synchronizing signal to the respective trunk circuits. Then, the clock extracting circuits of the other trunk circuits multiplex the extracted clock signals and sends them as multiplexed from the digital lines onto the transmission line in synchronism with the synchronizing signal.

In this way, since the clock signals extracted at all the trunk circuits are used to attain the synchronization of the digital exchange, even in the case where the trunk circuits are made respectively in the form of a trunk card, the cards can be freely plugged out. Further, even when trouble occurs in some of the lines leading to the trunk circuits, exchange synchronization can be reliably established and the occurrence of the trouble will not utterly affect the communication of the other normal trunk circuits, so long as at least one of the trunk circuits is normally operated.

In another aspect of the present invention, a shift in frequency synchronization between the synchronizing clock provided to the time-divisional switch and a frame synchronizing signal issued from the time-divisional switch is detected and when the shift reaches to a predetermined level, its own synchronizing clock is sent to the time-divisional switch.

With such an arrangement, even when the trunk circuit sending the extraction clock to the time-divisional switch becomes faulty, the other trunk circuits instead can act to send the extraction clock to the time-divisional switch to maintain the operation of the exchange, whereby the exchange can be improved in operational reliability.

BRIEF DESCRIPTION OF THE DRAWINGS

FIGS. 5(a)-5(e) are diagrams explaining the structure of format of a PCM data employed in the arrangement of FIG. 1;

FIGS. 8(a)-8(e) and 9(a)-9(e) are timing charts for explaining the operation of the embodiment of FIG. 7;

FIGS. 13(a)-13(j) are timing charts for explaining the operation of the embodiment of FIG. 11.

DESCRIPTION OF THE PREFERRED EMBODIMENTS

Figure 7:
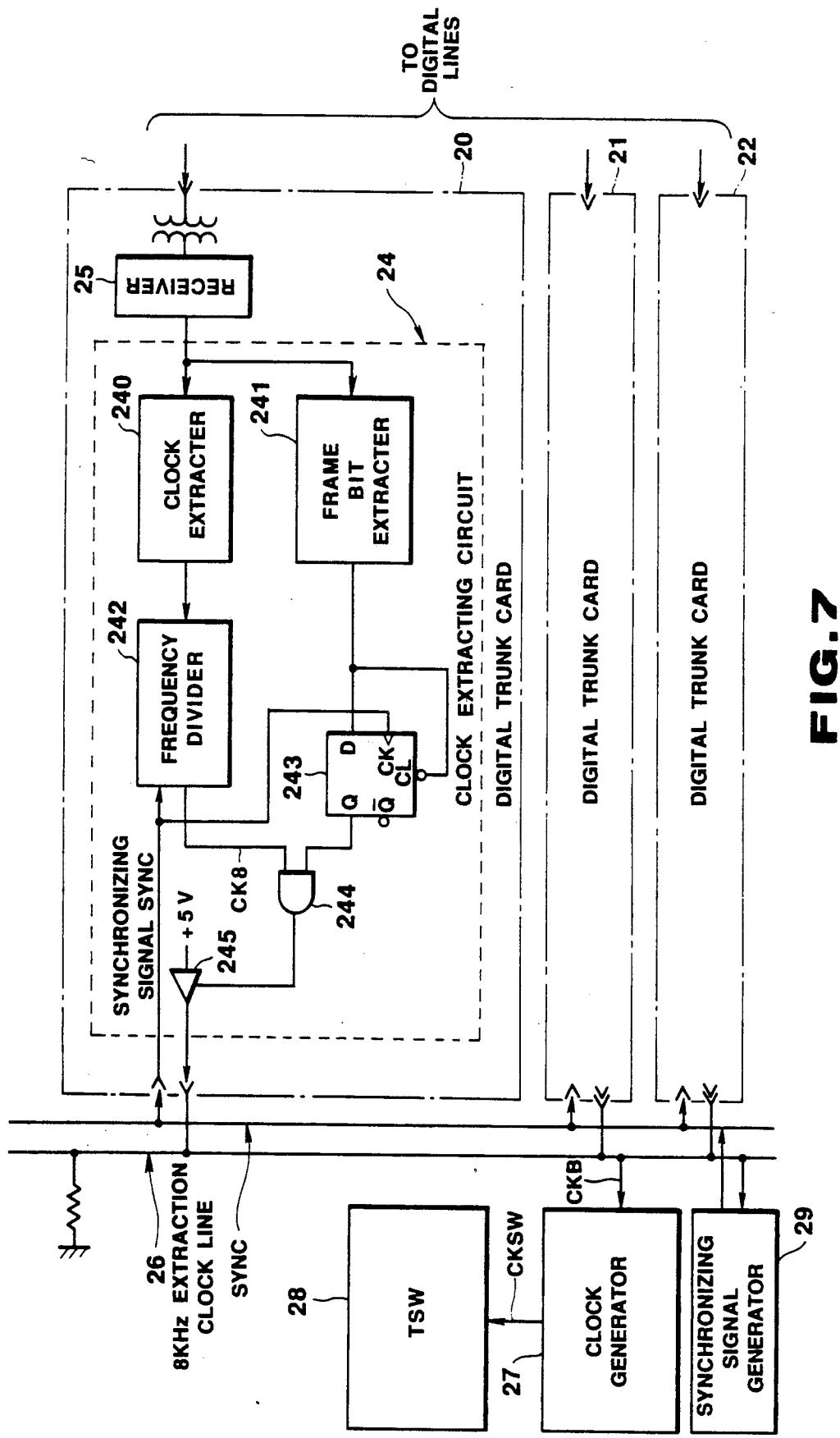
FIG. 7 is a block diagram showing an embodiment of the present invention.

Referring to FIG. 7, there is shown a block diagram of an embodiment of the present invention, which comprises digital trunk cards 20, 21 and 22 as trunk circuits. Each of the digital trunk cards 20, 21 and 22 includes a clock extracting circuit 24 and a receiver 25 for receiving a signal from an associated digital line (the details of only the digital trunk card 20 being shown). The clock extracting circuit 24 includes an clock extracter 240 for extracting a clock signal CK from the digital line, a frame bit extracting circuit 241 for extracting a frame bit and after extraction, for generating an output of high level "H", a frequency dividing circuit 242 for generating an extraction clock signal CK8 of 8 KHz on the basis of an output signal of the clock extracter 240, a flip-flop (D-FF) 243 for causing the transmission of the "H" level output of the frame bit extracting circuit 241 in response to a synchronizing signal SYNC and for stopping the output of the frequency dividing circuit 242 when it is impossible to extract a frame bit, an AND gate 244, and a buffer 245 for driving an 8KHz extraction clock line 26 on an open drain basis.

Figure 1:
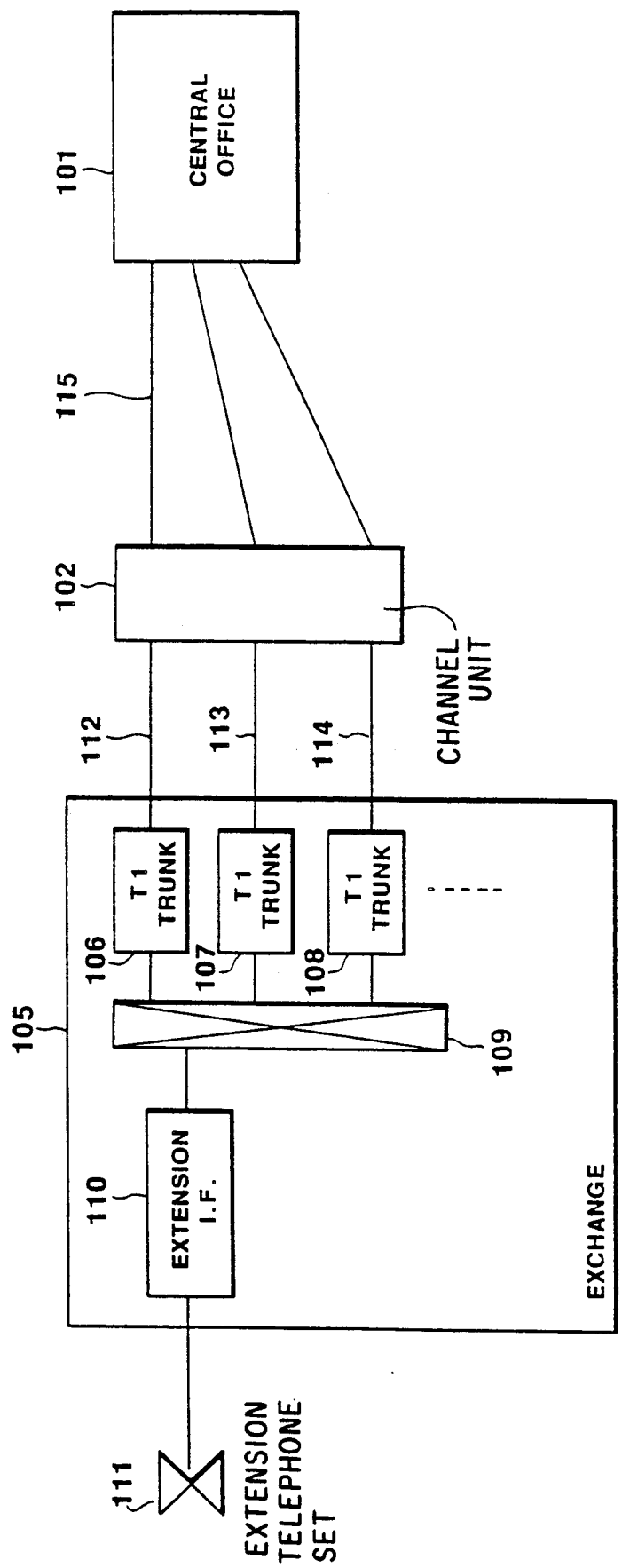
FIG. 1 is a block diagram showing an arrangement of a system based on a digital exchange including a plurality of T1 trunks.
Figure 2A:
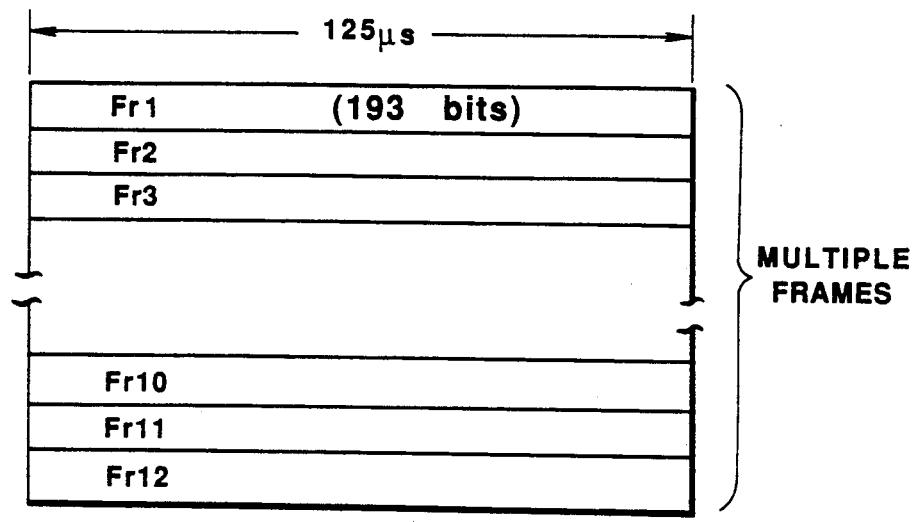
FIGS. 2(a) and 2(b) show an example of DS1 format employed in the arrangement of FIG. 1.
Figure 2B:
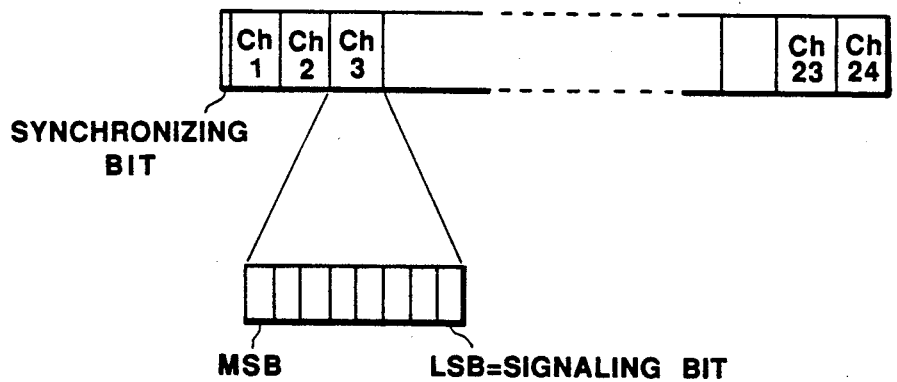
Figure 3:
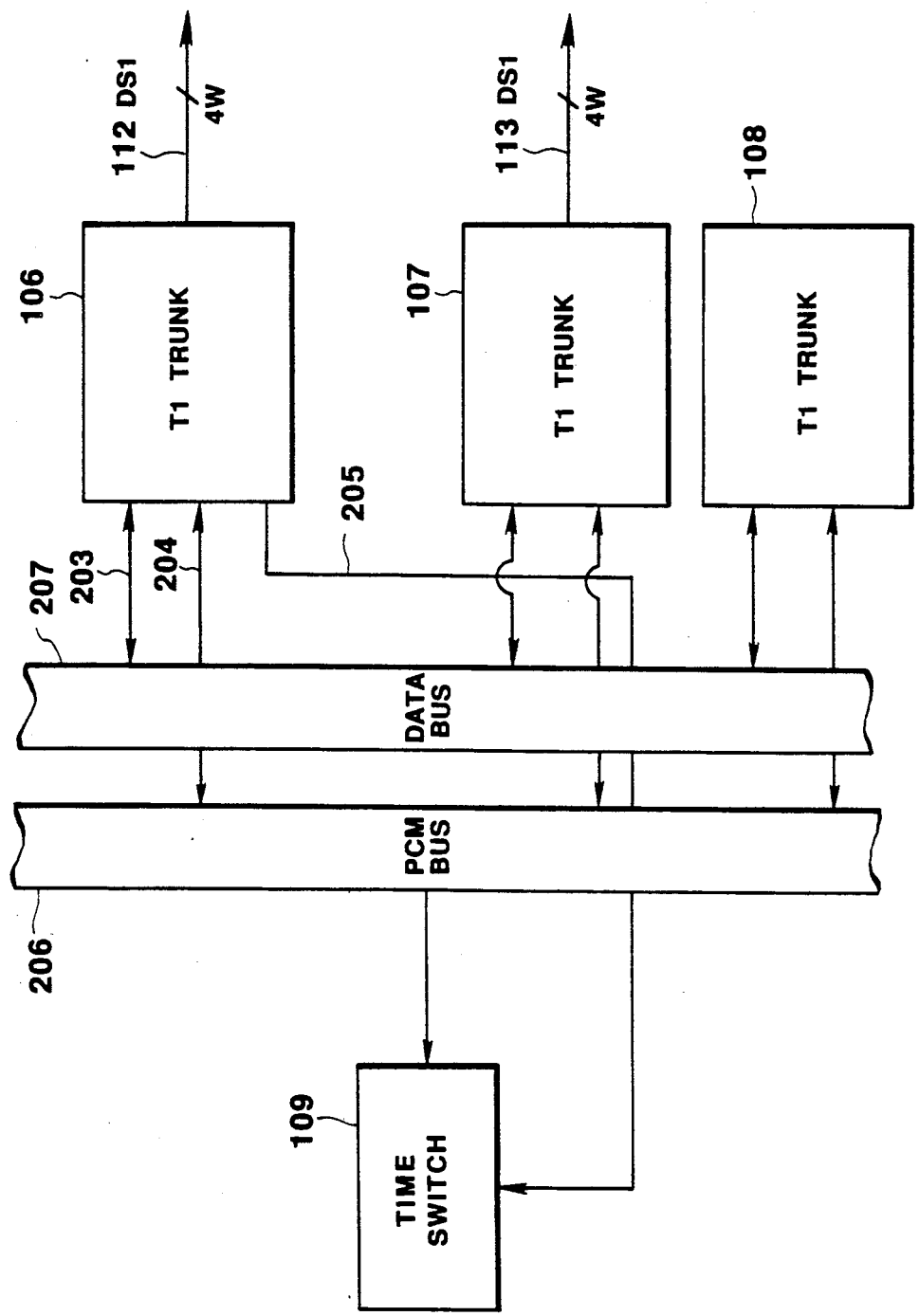
FIG. 3 is a block diagram showing in detail the digital exchange in FIG. 1.
Figure 4:
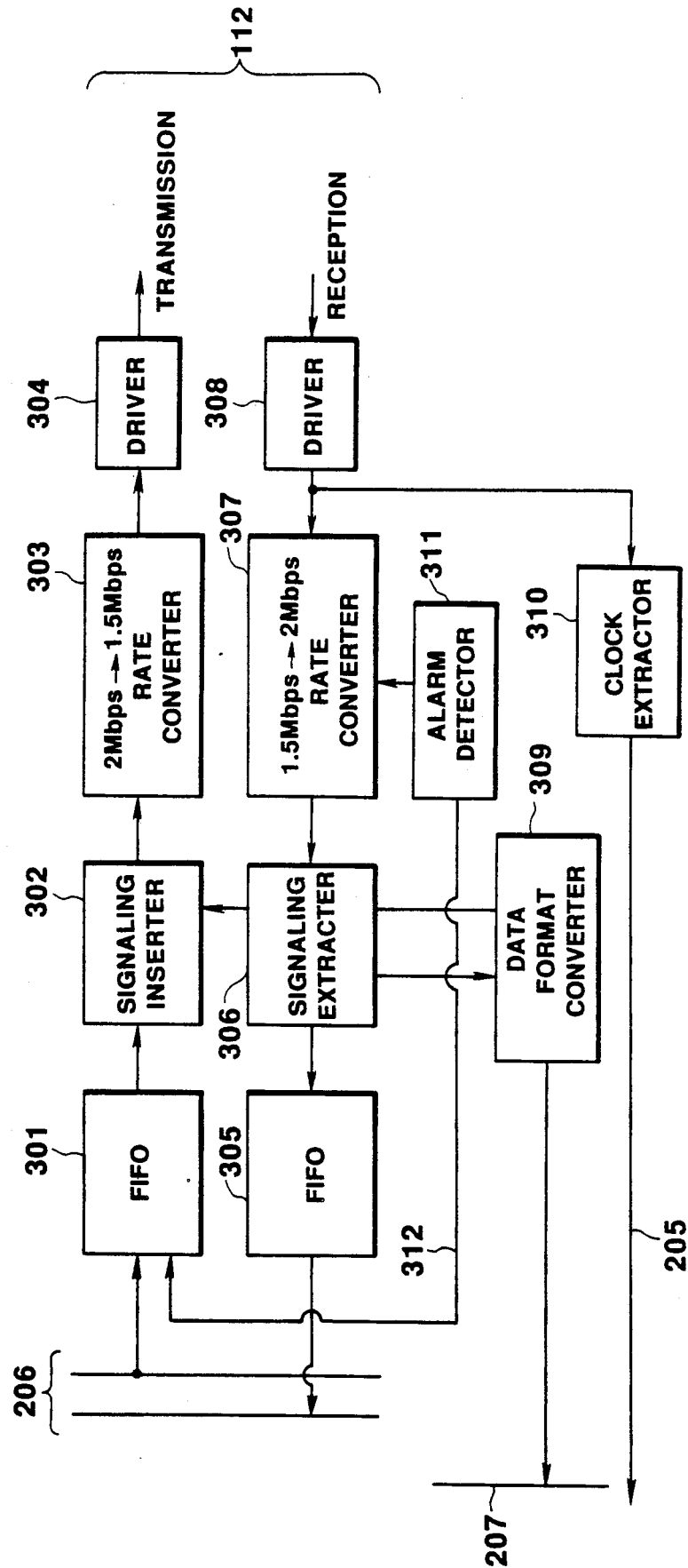
FIG. 4 is a block diagram showing in detail one of the T1 trunks in FIG. 1.
Figure 6:
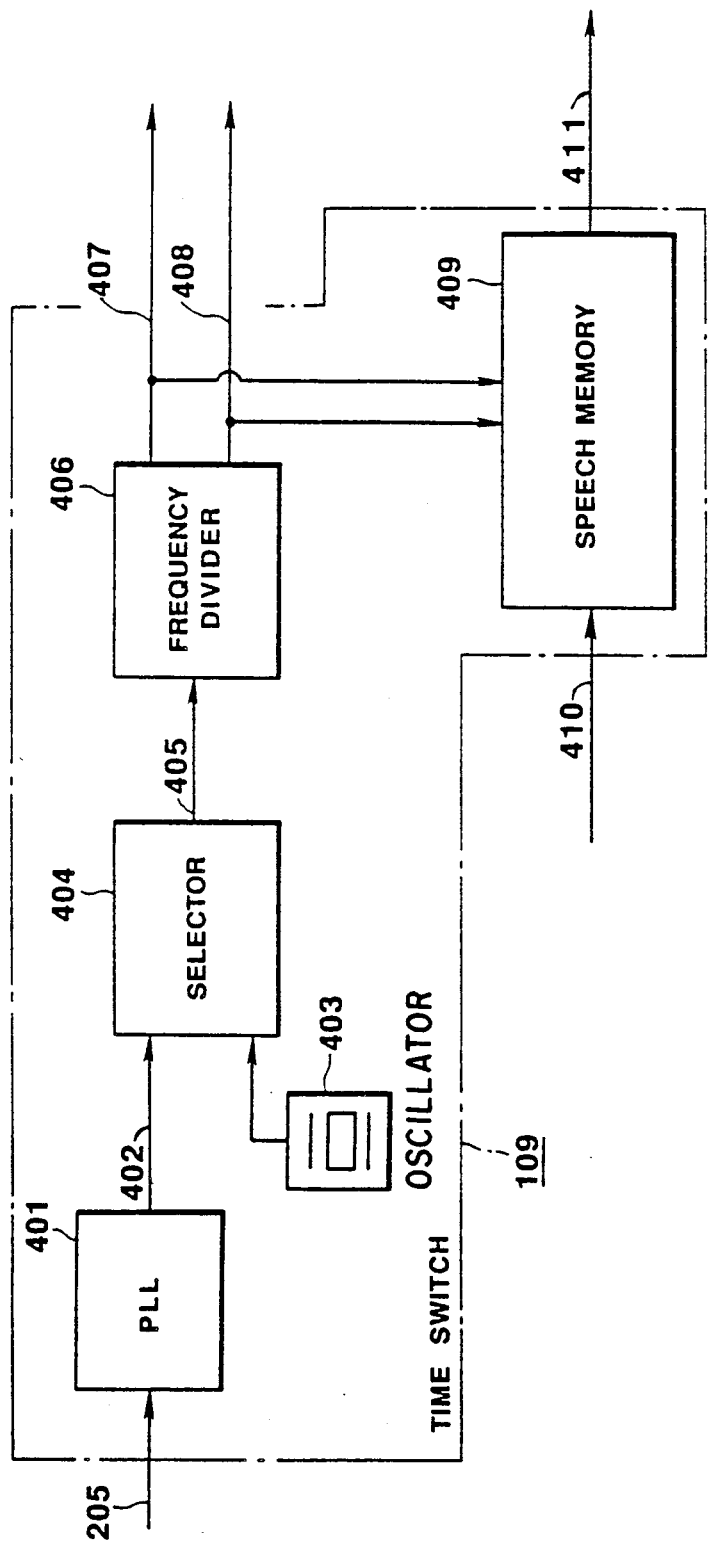
FIG. 6 is a block diagram showing a detailed arrangement of a time switch in FIG. 1.

A clock generating circuit 27 receives the clock signal CK8 from the 8 KHz extraction clock line 26 and for generating a clock signal CKSW on the basis of the received clock signal CK8 and sending it to a time switch (TSW) 28 for time-divisional exchanging operation through a PLL circuit and so on in the time switch in such a manner that a data on the digital line is synchronized with the operation of the time switch 28 of the exchange. The time switch 28 exchanges the PCM data shown in FIG. 3 on a time divisional basis on the PCM highway (PCM bus). In the arrangement shown in FIG. 3, the clock generating circut 27 is included in the time switch 109 and more specifically, a part including the clock generating circuit 27 and the time switch 28 in FIG. 7 corresponds to the time switch 109 in FIG. 3.

A synchronizing signal generating circuit 29 receives the clock signal CK8 from the 8 KHz extraction clock line 26 and generates the synchronizing signal SYNC for establishing synchronization in operation between the digital trunk cards 20, 21 and 22.

FIGS. 8 and 9 are timing charts for explaining the operation of the embodiment of FIG. 7, in which FIG. 8 is for explaining the operation of a digital trunk card inserted in (plugged in) in the course of the operation and FIG. 9 is for explaining the operation of the digital trunk card plugged out in the course of the operation. Explanation will be made as to the operation of the arrangement of FIG. 7 by referring to FIGS. 8 and 9.

Assume first that any one of the digital trunk cards is plugged in the exchange. Then, this causes power to be supplied to the inserted card so that, after passage of its initial time, the card reaches its stable condition. At this stage, the frame bit extracting circuit 241 extracts a frame (framing) bit from the signal on the associated digital line.

The framing bit will now be explained. For example, in the case of a first-order group of interfaces, data for 24 channels are multiplexed and transmitted at a transmission rate of 64Kbps per channel. This means that data are transmitted at a transmission rate of 192 bits (=24 channels ×8 bits) per frame or per 125μs. However, the data are merely continuously chained in the form of a series of data thus it is impossible to find the head part of data corresponding to one frame. To avoid this, in the present invention, one framing bit is attached to the head part of one frame for identification between frames. In this way, the presence or absence of occurrence of such an abonormal condition as a line trouble can be readily identified depending on the possibility or impossibility of extraction of a framing bit. Therefore, when the extraction of the framing bit is normally carried out on the 8 KHz extraction clock line 26, the invention is arranged to output the clock signal CK8.

To realize this, while the frame bit extraction is normally carried out, the frame bit extracting circuit 241 is arranged to generate an output signal of high (H) level and apply it to a D input terminal of the D-FF 243, whereby the D-FF 243 is put in a synchronizing signal (SYNC) awaiting condition.

Under this condition, if the synchronizing signal SYNC becomes active, then the D-FF 243 is set. The synchronizing signal is such a negative logic pulse as shown in FIG. 8(a) or FIG. 9(a) which is used to reset the frequency dividing circuit 242. The reason for it is as follows. In the event where many digital trunk cards are incoporated in the exchange, the phase of the clock signal CK8 of the clock extraction circuit 24 in each of the trunk cards varies from card to card. To avoid this, the frequency dividing circuits 242 of the respective cards are reset by the common synchronizing signal to thereby synchronize the clock signals CK8 of the respective cards. For attaining the phase synchronization, the frequency dividing circuits 242 may by reset at the time of turning the card ON, but after the turning ON it must be reset for another trunk card plugged in. To this end, the synchronizing signal SYNC is generated at the synchronizing signal generating circuit 29 and supplied to the frequency dividing circuit 242 at intervals of constant time to reset the frequency divider 242.

When the D-FF 243 generates an output of high (H) level (refer to FIG. 8(d)) in response to the above synchronizing signal SYNC, the AND gate 244 passes the output of the frequency divider 242 therethrough and sends it to the open-drain buffer 245 to apply +5 V to the 8 KHz extraction clock line 26. At this time, the frequency divider 242 are reset by the synchronizing signal SYNC. Accordingly, even when another digital trunk card is already inserted (even when the clock CK8 is already transmitted to the 8 KHz extraction clock line 26), the synchronizing signal is superimposed and thus the plug-in of a trunk card can be realized without affecting the signal on the 8 KHz extraction clock line 26.

Next, when any one of the trunk card is plugged out (removed) and the other trunk cards are in their operative condition, the already plugged-in trunk cards cause the continuous output of the 8 KHz extraction clock CK as shown by a timing chart of FIG. 9. As a result, the plug-out of the trunk card or cards can be carried out while not affecting the 8 KHz extraction clock CK8 and the 8 KHz extraction clock signal CK8 can be output for attaining synchronization between the digital lines and the exchange until the last trunk card removed.

In the illustrated embodiment, the frequency divider 242 of the clock extracting circuit 24 divides the output of the clock extracter 240 with respect to frequency to generate a division output having a frequency of 8 KHz, that is, equal to the sampling rate of the digital line and to establish synchronization between the exchange and the line. In the case of, for example, a first-order group of interfaces, however, 193 bits including the aforementioned framing bit are transmitted in a time of 125 μsec., so that, when such a 193-increment counter that can extract and count up to 193 clock pulses in the time of 125 μsec. is used, the 8 KHz extraction clock signal CK8 can be easily generated.

The 8 KHz extraction clock line 26 is connected to the plurality of digital trunks 20 to 22 so that the 8 KHz extraction clock signals CK8 extracted from the respective digital lines are superimposed on the clock line 26. When these signals CK8 are simply superimposed on each other, the superimposed 8 KHz extraction clock signal CK8 on the clock line 26 has a duty factor not exceeding 50%, since the outputs of the clock extracting circuits 24 of the respective digital trunks become different from each other in phase. Further, the output phase corresponds in maximum to nearly the output pulses of the clock extracting circuit 24 ± one pulse. Thus, when the frequency divider 242 is already reset, the outputs of the frequency dividers 242 of the respective digital trunks become erroneous. However, when the reset interval time of the frequency divider 242 is set to be long, a time rate of generating this error can be made sufficiently small and can be regarded substantially negligible. Thus, for attaining synchronization between the frequency dividers 242, the synchronizing signal SYNC is commonly used for the frequency dividers.

Figure 10:
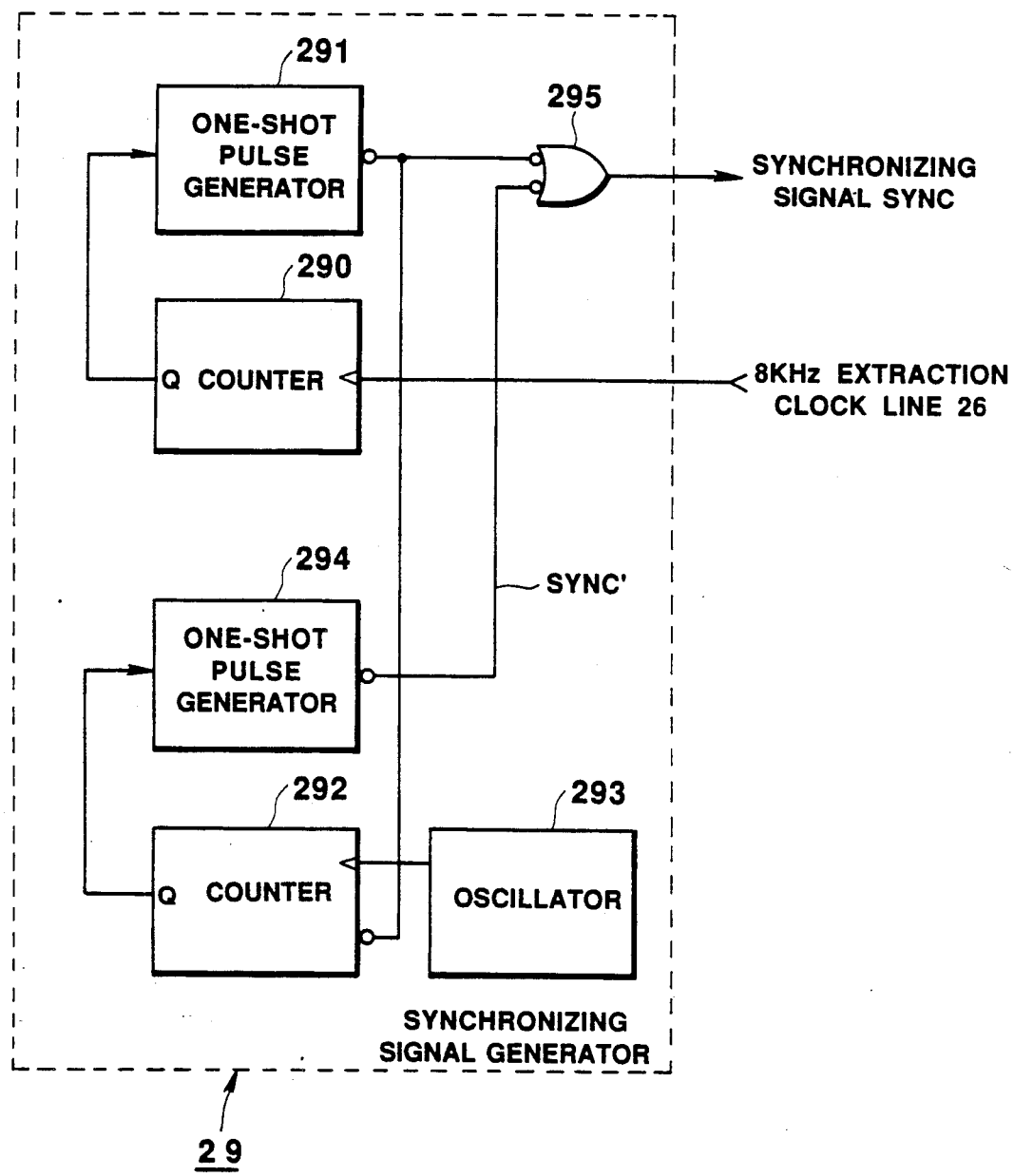
FIG. 10 is a block diagram for explaining the detailed operation of a synchronizing signal generating circuit in the embodiment of FIG. 7.

The synchronizing-signal generating circuit 29 for generating the synchronizing signal SYNC is arranged as shown in FIG. 10. That is, a counter 290 counts the 8 KHz signal received from the 8 KHz extraction clock line 26 and sends it to a one-shot pulse generating circuit 291 to generate thereat the synchronizing signal SYNC having a predetermined pulse width. The maximum count number of the counter 290 is set so that the period of the synchronizing signal SYNC corresponds to about 1 second. With such an arrangement, the synchronization error of the frequency dividers 242 can be made negligible and the set-up time when a digital trunk is plugged in the exchange can be practically made negligible.

In the illustrated embodiment, in the event where a first one of the digital turnks 20 to 22 is first plugged in, the synchronizing signal SYNC is not yet generated so that the clock signal CK8 does not appear on the 8 KHz extraction clock line 26. To overcome such a disadvantage, another counter 292 is provided separately from the counter 290 so that the counter 292 counts the clock signal received from an oscillator 293, a one-shot pulse generating circuit generates a pseudo sysnchronizing signal SYNC' as a one-shot pulse of about 1.1 seconds according to the output of the counter 292, the one-shot pulse is applied to an OR gate 295 which also receives the one-shot pulse from the one-shot pulse generator 291, whereby an output of the OR gate 295 is used as the synchronizing signal SYNC. In addition, the counter 292 is arranged to be cleared by the output of the counter 290. With such an arrangement of the synchronizing signal generator 29, the synchronizing signal SYNC is applied to the firstly-inserted digital trunk for a time period of about 1.1 seconds, whereby the 8 KHz extraction clock signal CK8 is output. Further, when the second digital trunk is plugged in, the counter 292 is cleared by the count output of the counter 290 before the counter 292 transmits its count output, so that, for the second and subsequent digital trunks, the 8 KHz extraction clock signal CK8 is output on the basis of the synchronizing signal SYNC generated through the counter 290.

In this way, with such an embodiment, the extraction clock signals from all the digital trunk cards housed within the exchange are used to establish synchronization with the digital lines and are not applied to faulty one of the lines, and further the extraction clock signals of all the digital trunk cards within the exchange are transmitted through the common transmission line. As a result, even when any of the digital trunk cards is plugged out, or even when one of the digital lines corresponding to the plugged-out trunk card becomes faulty, synchronization between the exchange and the digital lines can be reliably established and these digital trunk cards can be freely plugged in or out when it is desired to inspect the exchange for maintenance or other reasons. In addition, the present embodiment can advantageously avoid the enlargement of the exchange.

Figure 11:
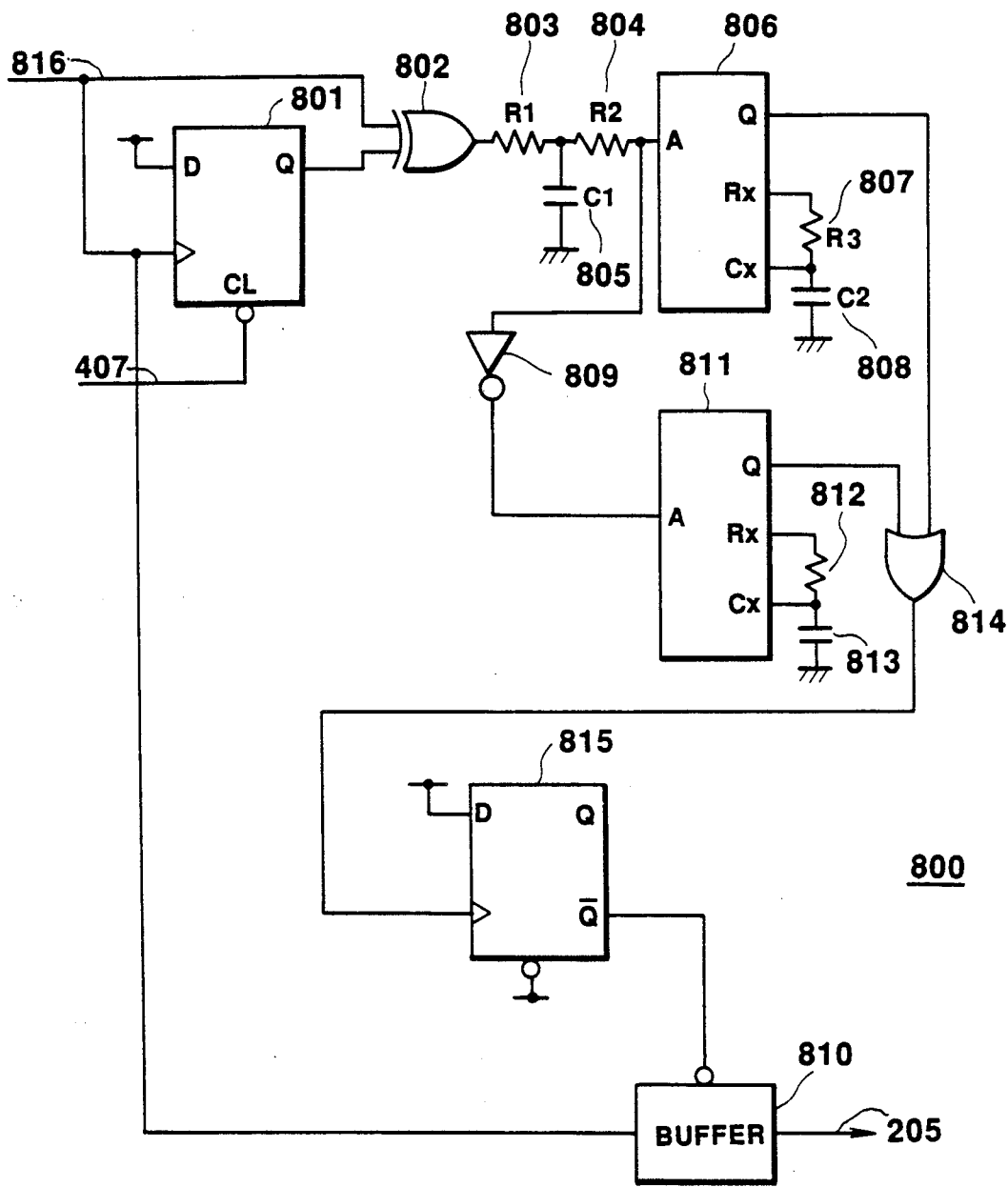
FIG. 11 is a block diagram of a major part of another embodiment of the present invention.

Shown in FIG. 11 is a major part of another embodiment of the present invention, and more specifically a block diagram of an arrangement of a monitor/control circuit to be attached to each one of the T1 trunks. The monitor/control circuit includes, as shown in FIG. 11, flip-flops 801 and 815, an XOR gate (exclusive "OR " gate) 802, resistors 803, 804, 807 and 812, capacitors 805, 808 and 813, one-shot circuits 806 and 811, an inverter 809, a 3-state buffer 810, and an OR gate 814. Reference numeral 816 represents an extracted DA1 clock signal.

The DS1 clock signal 816 is applied as an operational clock to the flip-flop 801 which also receives a frame pulse 407 as a clear signal. A Q output of the flip-flop 801 and the the DS1 clock signal 816 are applied to the XOR gate 802 to generate an exclusive "OR" therebetween. A circuit constituted of the resistors 803 and 804 and the capacitor 805 corresponds to an integrating circuit. The output of the XOR gate 802 is supplied through the integrating circuit to an input terminal A of the one-shot circuit 806 and also through the inverter 809 to an input terminal A of the one-shot circuit 811. A circuit of the resistor 807 and capacitor 808 and a circuit of the resistor 812 and capacitor 813 respectively connected to the one-shot circuits 806 and 911 are circuits for determining their time constants, and the one-shot circuits 806 and 811 are trigger type circuits which respectively output a pulse after applied with a trigger but when not applied again with a second trigger before the passage of a time corresponding to the aforementioned time constant. The outputs of the one-shot circuits 806 and 811 are supplied through the OR gate 814 to the flip-flop 815 as its clock, which flip-flop 815 in turn applies an output at its invert output terminal Q to the 3-state buffer 810 as its gate control signal. The DS1 clock signal 816 is also supplied through the 3-state buffer 810 to the time switch 109.

Figure 12:
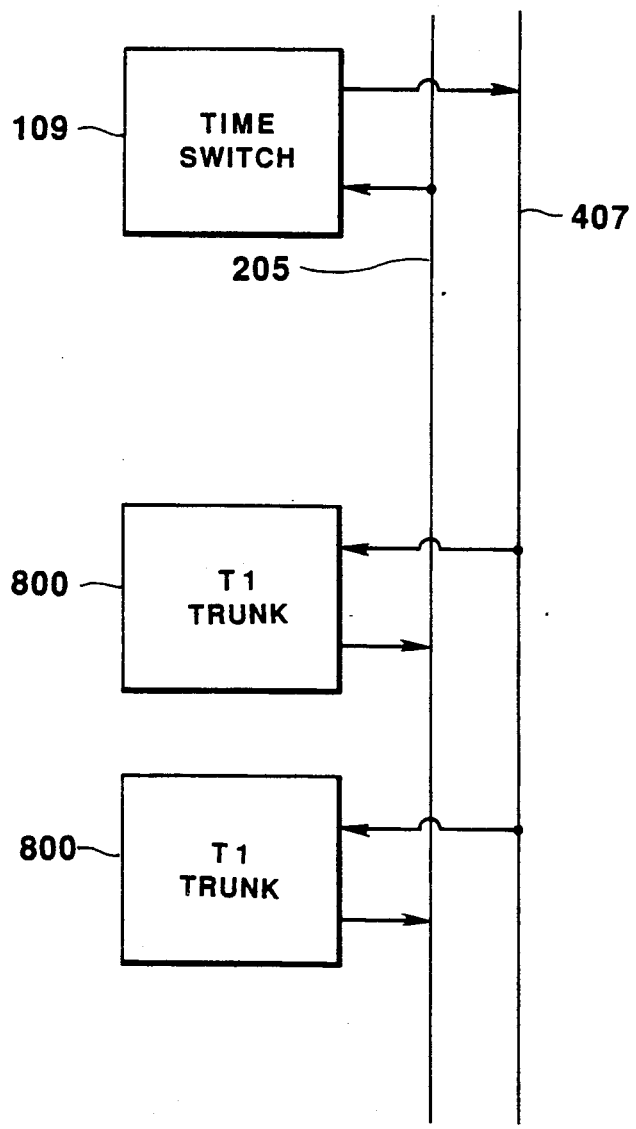
FIG. 12 shows the entire arrangement of the embodiment of FIG. 11.

The monitor/control circuit having such an arrangement as mentioned above is provided to each of the T1 trunks so that, as shown in FIG. 12, a T1 trunk 800 with the monitor/control circuit supplies its DS1 clock signal 205 to the time switch 109 and also the time switch 109 supplies its frame pulse 407 to each of the T1 trunks 800.

The operation of the present monitor/control circuit having such an arrangement will be explained by referring to a timing chart shown in FIG. 13.

The DS1 clock signal (refer to FIG. 13(b)) is applied to the clock terminal of the flip-flop 801, while the frame pulse (refer to FIG. 13(a)) from the time switch 109 is applied to the clear terminal of the flip-flop 801. And the output (refer to FIG. 13(c)) at the output terminal Q of the flip-flop 801 as well as the DS1 clock signal 816 (refer to FIG. 13(b)) are supplied to the XOR gate 802 to find an exclusive "OR" and to thereby detect a phase difference between the frame pulse and the DS1 clock signal. The output (refer to FIG. 13(d)) of the XOR gate 802 coresponding to the phase difference is sent through the aforementioned integrating circuit (including the resistors 803 and 804 and the capacitor 805) to the one-shot circuit 806. The integrating circuit is provided to eliminate noise components (spikes) from the output of the XOR gate 802. The output of the XOR gate 802 subjected to the noise elimination through the integrating circuit is applied to the one-shot circuit 806 (see FIG. 13(e)). More in detail, the output of the XOR gate 802 is applied to an input terminal A of the one-shot circuit 806 the time constant of which is determined the resistor 812 and the capacitor 808. When the output of the one-shot circuit 806 is not changed to its low level (L) in a time period corresponding to the above time constant after the change of the input of the one-shot circuit 806 from its high level (H) to low (L), the one-shot circuit 806 changes its output from low level to high (see FIG. 13 (f)).

To this end, if the frame pulse is not synchronized with the DS1 clock signal, then the duty factor of the pulse applied to the input terminal A of the one-shot circuit 806 varies with the period and becomes longer, as shown in FIG. 13(e).

In this connection, the time constant of the one-shot circuit 806 is set so that the circuit 806 generates the output not at a time point T1 but at a time point T2 (>T1). The output of the one-shot circuit 806 causes the flip-flop 815 as a DA1 extracting circuit to be inverted so that the buffer 810 is opened and the DS1 clock signal is sent to the time switch 109. In actual applications, the duty factor of the pulse at the input terminal A of the one-shot circuit 806 sometimes become short. In this case, the output of the one-shot circuit 811 receiving as its input a signal (see FIG. 13(g)) corresponding to an inversion of the input of the one-shot circuit 806 becomes long. The output (see FIG. 13(h)) of the one-shot circuit 811 and the output (see FIG. 13(f)) of the one-shot circuit 806 are applied to the OR gate 814 to obtain a logical sum thereof and the output of the OR gate 814 indictive of the logical sum is sent to the flip-flop 815.

Accordingly, the outputs of the one-shot circuits 811 and 806 can be used to detect whether or not synchronization with the time switch 109 is established. Even when the synchronization is not attained, the output of the OR gate 814 is applied to the DS1 extracting circuit (flip-flop) 815 to drive the same (see FIG. 13(j)) to open the 3-state gate buffer 810, whereby the DS1 clock signal extracted form the T1 trunk in question can be transmitted. In this case, when such a monitor/control circuit is provided to each of the T1 trunks, such measures must be previously taken that priorities are set for the T1 trunks and one of the T1 trunks for the DS1 clock signal to be issued is determined according to the priorities, or different triggering time constants are set for the respective trunks.

In this way, with the exchange according to the present embodiment, the function of issuing the DS1 extraction clock signal is provided to each of the T1 trunks, so that a phase difference between the frame pulse issued from the time switch and the own extracted clock is found, and when the phase difference exceeds a predetermined constant value, the exchange judges to be out of frequency synchronization and the own T1 trunk sends the DS1 clock signal to the time switch. Therefore, even when one of the plurality of T1 trunks which supplied to the DS1 clock signal to the time switch becomes faulty and stops the supply of the DS1 clock signal thereto, the other trunks instead can supply the clock signal and the time switch can synchronized and continuously operated.

While the present invention has been disclosed with reference to preferred embodiments, it should be understood that the invention is not limited to the particular embodiments but rather includes all alternatives, modifications and equivalent arrangements covered by the scope of the appended claims.

What is claimed is:

1. A digital exchange comprising:
a clock line;
a plurality of digital trunk circuits, each trunk circuit being associated with a digital line and including means for extracting a clock signal, corresponding to a data communication speed, from the associated digital line and for driving an extracted clock signal onto the clock line at a time when another trunk circuit is driving an extracted clock signal onto the clock line;
a time divisional switch connected to said trunk circuits, for performing interconnection for exchange of digital data;
a clock generating circuit, responsive to a clock signal on said clock line, for generating a clock signal to drive said time divisional switch; and
a synchronizing-signal generating circuit, responsive to the clock signal on the clock line, for generating a synchronizing signal having a predetermined period,
wherein each of said plurality of digital trunk circuits further includes means, responsive to the synchronizing signal, for driving said extracted clock signal onto said clock line in synchronism with said synchronizing signal.

2. A digital exchange as set forth in claim 1, wherein said clock extracting means includes a clock extracting circuit for extracting said clock signal corresponding to the data communication speed, a frame bit extracting circuit for extracting a frame bit from the associated digital line, and clock signal driving means for driving the extracted clock signal onto said clock line in synchronism with said synchronizing signal when a frame bit is extracted by said frame bit extracting circuit.

3. A digital exchange as set forth in claim 2, wherein said clock extracting means includes means for inhibiting the driving means when a frame bit is not extracted by said frame bit extracting circuit.

4. A digital exchange as set forth in claim 1, wherein said synchronizing-signal generating circuit includes means for counting said clock signal on said clock line, and means for generating a pulse signal each time a value counted by said counting means reaches a predetermined level, and the synchronizing-signal generating circuit generates said pulse signal as said synchronizing signal.

5. A digital exchange as set forth in claim 1, wherein said synchronizing-signal generating circuit includes count means for counting said first clock signal on said clock line; means for generating a first pulse signal each time a value counted by said first count means reaches a first predetermined level; an oscillator for generating a second pulse signal having a predetermined frequency; second count means for counting said second pulse signal generated by said oscillator; second pulse generating means for generating a third pulse signal each time a value counted at said second count means reaches a second predetermined level; and output means for outputting said third pulse signal of said second pulse generating means as said synchronizing signal when the clock signal is absent on the clock line and for outputting said first pulse signal of said first pulse generating means as the synchronizing signal when the clock signal is present on the clock line.

6. A digital exchange as set forth in claim 5, wherein a counting time of said fist counting means is set to be shorter than that of said second counting means, and said output means includes means for resetting the counted value of said second counting means on the basis of an output of said first pulse generating means; and a logical sum circuit for performing a logical sum operation of the output of said first pulse generating means and said second pulse generating means to obtain a logical sum signal and for outputting said logical sum signal as said synchronizing signal.

7. A method for controlling a digital exchange having a plurality of digital trunk circuits and a time divisional switch connected to said trunk circuits, each trunk circuit being associated with a digital line, for performing interconnection for data exchange, said method comprising the steps of:
- extracting a clock signal coresponding to a data communication speed from an associated digital line of each of said plurality of digital trunk circuits to produce extracted clock signals;
- concurrently driving said extracted clock signals onto a common clock line;
- generating a synchronizing signal having a predetermined period on the basis of a clock signal on said common clock line;
- synchronizing the extracted clock signals with said synchronizing signal; and
- generating a clock signal for driving said time divisional switch on the basis of the clock signal on the clock line.

8. A method as set forth in claim 7, further comprising the steps of detecting whether or not a frame bit is extracted from associated one of said digital lines, and inhibiting driving of an extracted clock signal from the associated digital line driving onto said common clock line when said frame bit is not extracted from the associated digital line.

9. A digital exchange comprising:
- a clock line;
- a plurality of digital trunk circuits, each trunk circuit being assiciated with a digital line and including means for extracting a clock signal, corresponding to a data communication speed, from the associated digital line and for driving an extracted clock signal onto the clock line at a time when another trunk circuit is driving an extracted clock signal onto the clock line;
- a time divisional switch connected to said trunk circuits, for performing interconnection for exchange of digital data; and
- a clock generating circuit, responsive to a clock signal on said clock line, for generating a clock signal to drive said time divisional switch,
wherein each of said plurality of digital trunk circuits further includes means for detecting a lack of synchronization between the clock signal on the clock line and a frame synchronizing signal issued from said time divisional switch, and output means for outputting said clock signal extracted at said clock extracting means onto the clock line when a phase difference between the clock signal on the clock line and the frame synchronizing signal exceeds a predetermined value.

10. A digital exchange as set forth in claim 9, wherein said means for detecting a lack of synchronization includes a flip-flop reset when receiving a frame pulse from said time divisional switch and set when receiving a rising edge in said clock signal corresponding to a data communication speed; an exclusive "OR" gate for performing an exclusive "OR" operation of an output of said flip-flop and the clock signal corresponding to a data communication speed; an integrating circuit for integrating an output of said exclusive "OR" gate; a first one-shot circuit triggered by an output of said integrating circuit; a second one-shot circuit triggered by an inverted output of the integrating circuit; and a logical sum circuit for a logical sum operation of an output of said first one-shot circuit and an output of said second one-shot circuit.

11. A method for controlling a digital exchange having a plurality of digital trunk circuits and a time divisional switch connected to said trunk circuits, for performing interconnection for exchange of digital data, said method, in each of said plurality of digital trunk circuits, comprising:
- extracting a clock signal corresponding to a data communication speed from an associated one of the digital trunk circuits;
- detecting a phase difference between a clock signal on a clock line and a frame synchronizing signal issued from said time divisional switch; and
- driving said clock signal extracted from said associated digital trunk circuit onto said clock line when said detected phase difference exceeds a predetermined value.

12. A digital exchange comprising a plurality of digital trunks each having a clock extracting circuit for extracting a clock signal corresponding to a data communication speed from associated one of digital lines and for driving the extracted clock signal at a time when another trunk is driving an extracted clock signal; and a clock generating circuit for generating a time divisional exchange clock signal to synchronize an exchange rate of a time-divisional exchange switch on the basis of said clock signals extracted at said plurality of digital trunks, wherein a common transmission line is used for the clock signals extracted at the digital trunks, a synchronizing-signal generating circuit is provided for generating a sychronizing signal having a predetermined period with use of a clock signal received from one of the digital trunks through said common transmission line, and said clock extracting circuit in each of the digital trunks is provided with a circuit for sending the extracted clock signal from the digital line onto the transmission line in synchronism with said synchronizing signal.

13. An digital exchange comprising a plurality of trunks provided as interfaces with T1 digital lines respectively, each trunk including means for extracting a clock in synchronism with an associated one of said T1 digital lines, wherein an extracted clock of an associated T1 digital line is provided to a time divisional switch connected to said trunk circuits, for processing a transmission signal on a time divisional multiplex basis for frame synchronization, and each of said trunks includes detection means for detecting a phase difference between said synchronizing clock provided to said time divisional switch and a frame synchronizing signal issued from the time divisional switch and means for sending its own synchronizing clock to the time divisional switch when said phase difference reaches a predetermined level. 1

* * * * *

UNITED STATES PATENT AND TRADEMARK OFFICE
CERTIFICATE OF CORRECTION

PATENT NO.  : 5,099,474
DATED       : March 24, 1992
INVENTOR(S) : EIJI OHTSUKA ET AL.

It is certified that error appears in the above-indentified patent and that said Letters Patent is hereby corrected as shown below:

Claim 6, column 10, line 62, change "fist" to --first--.

Claim 7, column 11, line 10, change "coresponding" to --corresponding--.

Claim 9, column 11, line 34, change "assiciated" to --associated--.

Claim 12, column 12, line 39, change "sychronizing" to --synchronizing--.

Claim 13, column 12, line 47, change "An" to --A--.

Claim 13, column 12, line 62, after "level." delete "1"

Signed and Sealed this

Fourth Day of January, 1994

Attest:

BRUCE LEHMAN

*Attesting Officer*     Commissioner of Patents and Trademarks